INVENTORS
MASAO KITAJIMA
YOOZI TSUNEOKA
ASAJI KONDO

ATTORNEYS

United States Patent Office 3,703,576
Patented Nov. 21, 1972

3,703,576
METHOD OF PRODUCING MICRO-CAPSULES ENCLOSING ACETYLSALICYLIC ACID THEREIN
Masao Kitajima, Yoozi Tsuneoka, and Asaji Kondo, Saitama, Japan, assignors to Fuji Photo Film Co., Ltd., Kanagawa, Japan
Filed Aug. 10, 1970, Ser. No. 62,410
Claims priority, application Japan, Aug. 8, 1969, 44/62,738
Int. Cl. A61j 3/07
U.S. Cl. 424—35            10 Claims

ABSTRACT OF THE DISCLOSURE

A method for encapsulating acetylsalicylic acid which comprises dispersing acetylsalicylic acid in an organic solvent solution of a cellulose derivative, dispersing the resulting dispersion in the form of droplets in a concentrated aqueous solution of an inorganic salt and evaporating the organic solvent from the system, is disclosed.

BACKGROUND OF THE INVENTION (1) Field of the invention

This invention relates to a method of producing microcapsules of a cellulose derivative containing acetylsalicylic acid therein. The method advantageously used a phase separation of a concentrated aqueous solution of an inorganic salt.

(2) Description of the prior art

Hitherto, particles of acetylsalicylic acid ("Aspirin") have been coated to minimize decomposition of the acetylsalicylic acid and to provide acetylsalicylic acid capsules from which acetylsalicylic acid, when taken as medicine, is released continuously. An advantageous method of the manufacture of such capsules is disclosed in U.S. Pat. 3,341,416.

This method, however, has many disadvantages such as, for example, the need for pretreating the particles of acetylsalicylic acid, for heating of the mixture to a temperature of 80° C. in the initial stage of encapsulation, for using inflammable cyclohexane as a medium of encapsulation and risking of fire accompanying the heating of the solvent to 80° C., for removing particles of polyethylene formed as a by-product by screening after encapsulation, and for eliminating the residual solvent.

The method of the present invention is excellent since the operation is simple, the working temperature is not high enough to cause decomposition of the acetylsalicylic acid and no impurity is formed as a byproduct in the operation.

SUMMARY OF THE INVENTION

The process of the present invention is a process for encapsulating acetylsalicylic acid and comprises dispersing acetylsalicylic acid in an organic solvent solution of a cellulose derivative, dispersing the resulting dispersion in the form of droplets in a concentrated aqueous solution of an inorganic salt and evaporating the organic solvent from the system.

DESCRIPTION OF THE DRAWINGS

The method of the present invention is generally illustrated by the accompanying drawings, in which.

DETAILED DESCRIPTION OF THE INVENTION

Figure 1:
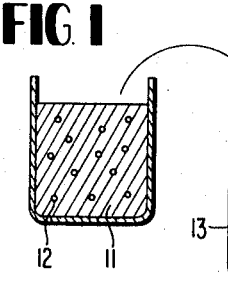
FIGS. 1 to 3 are diagrammatic illustrations of the formation of acetylsalicylic acid capsules according to the method of the present invention.
Figure 2:
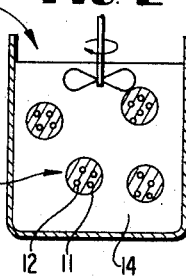
Figure 3:
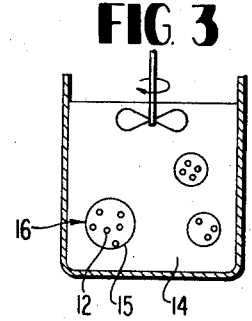

In the step indicated in FIG. 1, a cellulose derivative is dissolved in an organic solvent in which acetylsalicylic acid is only slightly soluble but which is completely or partially miscible with water. To the resulting polymer solution 11 a finely divided acetylsalicylic acid 12 is dispersed to form a dispersion of acetylsalicylic acid. The dispersion is further dispersed in the form of droplets in a concentrated aqueous solution 14 of an inorganic salt, as shown in FIG. 2. Droplet 13 is composed of finely divided particles of acetylsalicylic acid 12 dispersed in polymer solution 11. When the organic solvent is removed by heating the system or putting the system under reduced pressure, capsules 16, enclosing the finely divided particles, acetylsalicylic acid 12 therein are formed as shown in FIG. 3 encapsulated with cellulose derivative 15. Silica is added so that encapsulation proceeds smoothly without coagulating each droplet 13. The size of the capsules is in the range of from 20 microns to 2 millimeters and depends mainly on the manner of agitation of the system.

In the above steps, if a small amount of a fine powder, such as silica, starch or kaolin, is added to the aqueous solution of the inorganic salt prior to the dispersion of the acetylsalicylic acid dispersion therein, the encapsulation proceeds smoothly without coagulating each droplet 13, whereby mononuclear capsules are obtained. However, this step is not always necessary.

The finely divided acetylsalicylic acid used in the practice of the present invention should be of a particle size of from 2 microns to 500 microns. Suitable cellulose derivatives which can be used are ethylcellulose, acetylcellulose, benzylcellulose, cellulose acetate, cellulose butyate and cellulose acetate phthalate. Use of celluose acetate phthalate results in capsules which are insoluble in the stomach and soluble only in the intestines.

The solvent for the cellulose derivative can be selected from those organic solvents that are completely or at least partly miscible with water, preferably those having boiling points lower than that of water and those salting out from aqueous solutions to form a separate phase by addition of an aqueous inorganic salt solution. Such suitable solvents are, for example, acetone, methyl ethyl ketone, methyl acetate, ethyl acetate, dioxane and tetrahydrofuran. The selective use of a water-miscible organic solvent is based on the experienced fact that a water-miscible solvent is more easily removable than a water-immiscible solvent from the droplets of the cellulose derivative solution containing a finely divided acetylsalicylic acid dispersed therein.

The inorganic salt which can be used includes inorganic salts having high water solubility, such as ammonium sulfate, disodium phosphate or ammonium chloride. The inorganic salt is used as a saturated or nearly saturated aqueous solution. Adding the salt prevents dissolution of the acetylsalicylic acid into water due to a salting-out action and makes the water-miscible organic solvent immiscible with the aqueous medium.

The cellulose derivative is used in an amount of from 1% to about 100% by weight of the acetylsalicylic acid. The cellulose derivative is used in the form of a solution at a concentration of from 1% to about 20%. The aqueous salt solution is used at a volume of from 2 times to 50 times greater than the volume of the acetylsalicylic acid dispersion in the organic solvent.

Encapsultaion is advantageously carried out at temperatures below about 40° C.

EXAMPLE 1

In a solution of 1 g. of ethylcellulose dissolved in 50 ml. of methylacetate, there was dispersed 9 g. of a finely divided acetylsalicylic acid. The dispersion thus obtained was added at room temperature with stirring to 300 ml. of a saturated aqueous solution of ammonium sulfate to form droplets of the acetylsalicylic acid dispersion dispersed in the solution. The mixture was heated to 30° C. and stirred at that temperature for 2 hours to evaporate the methyl acetate and to form the capsule of rigid ethylcellulose enclosing the particles of the acetylsalicylic acid therein. The capsules were recovered using a filter cloth, washed with 1 liter of cold water and dried under reduced pressure. Thus, acetylsalicylic acid particle sizes in the range of from 0.3 to 1.5 mm. in a total weight of 8.5 g. were obtained.

Figure 4:
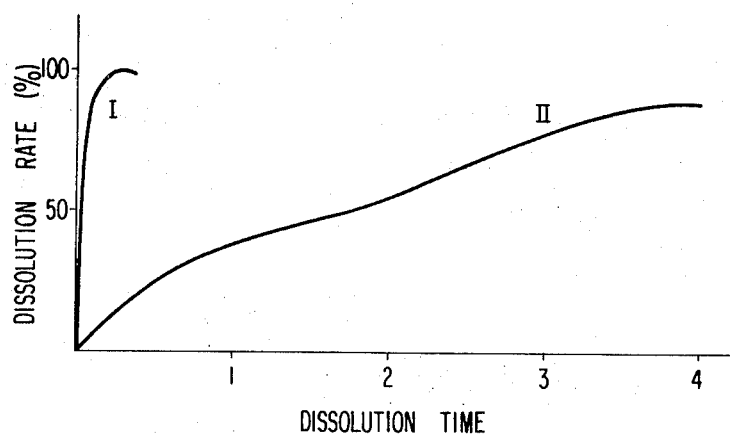
FIG. 4 is a graph showing the dissolution of the acetylsalicylic acid capsules of the present invention.

FIG. 4 is a graph showing the solubility curve of the capsule obtained as above in comparison with untreated acetylsalicylic acid particles. When put in a buffer solution at pH 2.0 and at a temperature of 36.5° C. the untreated particles of finely divided acetylsalicylic acid completely dissolved in about 15 minutes, as shown by curve I. With the encapsulated acetylsalicylic acid 50% of the acetylsalicylic acid contained in the capsule was leached out in about 2 hours and a time of at least 5 hours was required for complete leaching-out of the acetylsalicylic acid as shown by curve II.

EXAMPLE 2

In a solution of 1.5 g. of ethylcellulose dissolved in 30 ml. of methyl acetate, there was dispersed 4 g. of finely divided acetylsalicylic acid. The dispersion was dispersed in the form of droplets in a salt solution prepared by dispersing 15 g. of a fine silica in 300 ml. of a saturated aqueous solution of disodium phosphate and adjusting the pH to 4.5 by addition of phosphoric acid. The mixture was processed in the same manner as described in Example 1 to recover encapsulated acetylsalicylic acid of particle sizes within the range of from 1 to 3 mm. in a total weight of 4.5 g.

What is claimed is:

1. A method for preparing substantially mononuclear microcapsules of particulate acetylsalicylic acid, smoothly, and without droplet coagulation, which steps consist essentially of:
   (a) dispersing acetylsalicylic acid in an organic solvent solution consisting essentially of an organic solvent, which is completely or partially miscible with water and capable of being salted out from an aqueous solution in the presence of a non-toxic pharmaceutically acceptable inorganic salt exhibiting high water solubility, and a stomach-insoluble, intestine-soluble cellulose derivative,
   (b) dispersing the resulting dispersion in the form of droplets, in a concentrated substantially saturated aqueous solution of a non-toxic pharmaceutically acceptable inorganic salt exhibiting high water solubility, and
   (c) subsequently evaporating at a temperature below 40° C., said organic solvent from the system, said inorganic salt functioning to prevent dissolution of said acetylsalicylic acid into water due to a salting-out-action and permitting the water-miscible organic solvent to become immiscible with the aqueous medium.

2. The method of claim 1, wherein the particle size of said acetylsalicylic acid ranges from 2 microns to 500 microns.

3. The method of claim 1, wherein said cellulose derivative is a member selected from the group consisting of ethyl cellulose, acetyl cellulose, benzyl cellulose, cellulose acetobutylate and cellulose acetylphthalate.

4. The method of claim 1, wherein said organic solvent is a member selected from the group consisting of acetone, methyl ethyl ketone, methyl acetate, ethyl acetate, dioxane, and tetrahydrofuran.

5. The method of claim 1, wherein said non-toxic pharmaceutically acceptable inorganic salt is a member selected from the group consisting of ammonium sulphate, disodium phosphate, and ammonium chloride.

6. The method of claim 1, wherein said concentrated aqueous solution of said non-toxic pharmaceutically acceptable inorganic salt contains a pharmaceutically acceptable inert fine powder.

7. The method of claim 6, wherein said pharmaceutically acceptable inert fine powder is a member selected from the group consisting of silica, starch, and kaolin.

8. The method of claim 1, wherein said cellulose derivative is present in a concentration of from 1.0 to 100%, by weight, of said acetylsalicylic acid.

9. The method of claim 1, wherein said aqueous inorganic salt solution is employed in a volume of from 2X to 50X greater than the volume of said acetylsalicylic acid dispersion in said organic solvent.

10. A substantially mononuclear microencapsulated particulate acetylsalicylic acid product prepared in accordance with claim 1.

References Cited

UNITED STATES PATENTS

| 3,565,559 | 2/1971 | Sato et al. | 424—37 |
| 3,341,416 | 9/1967 | Anderson et al. | 424—35 X |
| 3,488,418 | 1/1970 | Holliday et al. | 424—35 |
| 3,155,590 | 11/1964 | Miller et al. | 424—35 X |

SHEP K. ROSE, Primary Examiner

U.S. Cl. X.R.
252—316; 424—230